(12) United States Patent
Ferguson et al.

(10) Patent No.: US 11,568,470 B2
(45) Date of Patent: Jan. 31, 2023

(54) HARDWARE AND SOFTWARE MECHANISMS ON AUTONOMOUS VEHICLE FOR PEDESTRIAN SAFETY

(71) Applicant: Nuro, Inc., Mountain View, CA (US)

(72) Inventors: David Ferguson, San Francisco, CA (US); Jiajun Zhu, Palo Alto, CA (US); Nick Vines, San Francisco, CA (US); Russell Smith, Los Altos, CA (US)

(73) Assignee: NURO, INC, Mountain View, CA (US)

( * ) Notice: Subject to any disclaimer, the term of this patent is extended or adjusted under 35 U.S.C. 154(b) by 183 days.

(21) Appl. No.: 17/089,055

(22) Filed: Nov. 4, 2020

(65) Prior Publication Data

US 2021/0046897 A1 Feb. 18, 2021

Related U.S. Application Data

(62) Division of application No. 16/048,797, filed on Jul. 30, 2018, now Pat. No. 10,882,488.

(Continued)

(51) Int. Cl.
*G05D 1/02* (2020.01)
*G06Q 30/06* (2012.01)
(Continued)

(52) U.S. Cl.
CPC ............ *G06Q 30/0631* (2013.01); *A23L 2/52* (2013.01); *A23L 5/00* (2016.08); *A23L 7/109* (2016.08); *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01);
(Continued)

(58) Field of Classification Search
None
See application file for complete search history.

(56) References Cited

U.S. PATENT DOCUMENTS 7,036,844 B2   5/2006   Hammer et al.
9,802,568 B1  10/2017   Lamer
(Continued)

FOREIGN PATENT DOCUMENTS

CN   1730318    2/2006
CN   101743151   6/2010
(Continued)

OTHER PUBLICATIONS

First Examination Report in counterpart Indian Application No. 201947052786, dated Aug. 26, 2021, 6 pages.
(Continued)

*Primary Examiner* — David P. Merlino

(57) ABSTRACT

An autonomous robot vehicle includes a front side and an energy absorbing system. The front side includes a front bumper and a front face including a frame defining a cavity. The energy absorbing system includes an energy absorbing member mounted in the cavity of the frame, and an inflatable airbag. The energy absorbing member is configured to reduce impact on an object struck by the autonomous robot vehicle. The inflatable airbag is mounted on the front side of the autonomous robot vehicle such that when the inflatable airbag is deployed, the inflatable airbag is external to the autonomous robot vehicle.

22 Claims, 15 Drawing Sheets

Related U.S. Application Data

(60) Provisional application No. 62/538,538, filed on Jul. 28, 2017.

(51) Int. Cl.

| | |
|---|---|
| *G08G 1/04* | (2006.01) |
| *B60P 3/00* | (2006.01) |
| *B60R 21/34* | (2011.01) |
| *B65G 67/24* | (2006.01) |
| *G01C 21/34* | (2006.01) |
| *G05D 1/00* | (2006.01) |
| *G05D 1/12* | (2006.01) |
| *G06K 7/10* | (2006.01) |
| *G06Q 10/06* | (2012.01) |
| *G06Q 10/08* | (2012.01) |
| *G06Q 50/12* | (2012.01) |
| *G06Q 50/28* | (2012.01) |
| *G08G 1/00* | (2006.01) |
| *H04L 67/12* | (2022.01) |
| *G06N 20/00* | (2019.01) |
| *B60R 25/25* | (2013.01) |
| *A23L 5/00* | (2016.01) |
| *A23L 7/109* | (2016.01) |
| *G06F 16/955* | (2019.01) |
| *A23L 2/52* | (2006.01) |
| *A47J 37/06* | (2006.01) |
| *A47J 47/00* | (2006.01) |
| *B60H 1/00* | (2006.01) |
| *B60P 1/36* | (2006.01) |
| *B60P 3/025* | (2006.01) |
| *B60R 19/18* | (2006.01) |
| *G06K 7/14* | (2006.01) |
| *G06K 19/06* | (2006.01) |
| *G06Q 20/00* | (2012.01) |
| *G06Q 20/12* | (2012.01) |
| *G06Q 20/18* | (2012.01) |
| *G07F 17/00* | (2006.01) |
| *G07F 17/12* | (2006.01) |
| *G07C 5/02* | (2006.01) |
| *G07C 5/08* | (2006.01) |
| *G06V 20/56* | (2022.01) |
| *G06V 20/64* | (2022.01) |
| *G06Q 30/02* | (2012.01) |
| *G06Q 50/30* | (2012.01) |
| *G06K 19/07* | (2006.01) |
| *H04W 4/024* | (2018.01) |
| *H04W 4/40* | (2018.01) |
| *G01C 21/20* | (2006.01) |
| *B60R 19/48* | (2006.01) |
| *G06F 3/0484* | (2022.01) |
| *B60R 21/36* | (2011.01) |
| *H04N 5/76* | (2006.01) |
| *H05B 6/68* | (2006.01) |

(52) U.S. Cl.
CPC ............ *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0265* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G06V 20/56* (2022.01); *G06V 20/64* (2022.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(56) References Cited

U.S. PATENT DOCUMENTS

| | | |
|---|---|---|
| 10,029,638 B1 | 7/2018 | Lombrozo et al. |
| 10,106,124 B1 | 10/2018 | Larner et al. |
| 10,336,290 B1 | 7/2019 | Lazaro et al. |
| 2003/0062208 A1 | 4/2003 | Hamada et al. |
| 2004/0074688 A1 | 4/2004 | Hashimoto et al. |
| 2005/0206139 A1 | 9/2005 | Mori et al. |
| 2008/0202839 A1 | 8/2008 | Satou et al. |
| 2009/0066069 A1 | 3/2009 | Takahashi et al. |
| 2009/0084620 A1 | 4/2009 | Matsuura et al. |
| 2009/0229906 A1 | 9/2009 | Takahashi et al. |
| 2009/0242308 A1 | 10/2009 | Kitte et al. |
| 2010/0052294 A1 | 3/2010 | Kim et al. |
| 2010/0084426 A1 | 4/2010 | Devers et al. |
| 2010/0148476 A1 | 6/2010 | Inoue et al. |
| 2010/0156070 A1 | 6/2010 | Takahashi et al. |
| 2010/0230944 A1 | 9/2010 | Narita et al. |
| 2010/0244413 A1 | 9/2010 | Hayashi et al. |
| 2010/0252350 A1 | 10/2010 | Hayashi et al. |
| 2010/0252351 A1 | 10/2010 | Okamoto et al. |
| 2010/0269730 A1* | 10/2010 | Horlacher ............... B60R 21/36 180/274 |
| 2013/0119681 A1 | 5/2013 | Mendis et al. |
| 2014/0081445 A1 | 3/2014 | Villamar |
| 2014/0087126 A1 | 3/2014 | Quaderer |
| 2015/0000994 A1 | 1/2015 | McLundie |
| 2015/0006005 A1 | 1/2015 | Yu et al. |
| 2015/0008064 A1 | 1/2015 | Park |
| 2015/0137492 A1 | 5/2015 | Rao et al. |
| 2015/0336524 A1 | 11/2015 | Larner et al. |
| 2015/0367799 A1 | 12/2015 | Le et al. |
| 2016/0200286 A1 | 7/2016 | Farrington |
| 2016/0207495 A1 | 7/2016 | Le et al. |
| 2016/0264087 A1 | 9/2016 | Ohmura |
| 2016/0355152 A1 | 12/2016 | Perez Garcia et al. |
| 2017/0113641 A1 | 4/2017 | Thieberger et al. |
| 2017/0174343 A1 | 6/2017 | Erickson et al. |

(56) References Cited

U.S. PATENT DOCUMENTS

2018/0162316 A1  6/2018  Saito et al.
2019/0001919 A1  1/2019  Farooq et al.

FOREIGN PATENT DOCUMENTS

| CN | 102781731    | 11/2012 |
| EP | 0958969 B1   | 8/2003  |
| EP | 1652740 A    | 5/2006  |
| GB | 2344080 A    | 5/2000  |
| JP | H06189610 A  | 7/1994  |
| JP | 2006240351 A | 9/2006  |
| WO | 2008062128 A1 | 5/2008 |
| WO | 2017072679 A1 | 5/2017 |

OTHER PUBLICATIONS

Examination Report in corresponding European Application No. 18756040.4, dated Oct. 30, 2020, 6 pages.
International Search Report and Written Opinion issued in corresponding International Application No. PCT/JS2018/044320 dated Oct. 8, 2018.
International Search Report and Written Opinion issued in International Application No. PCT/US2018/044361 dated Oct. 10, 2018.
Mizukura, Taiji; Machine Translation of JP-06189610-A; Jul. 1994; espacenet.com (Year: 1994).

* cited by examiner

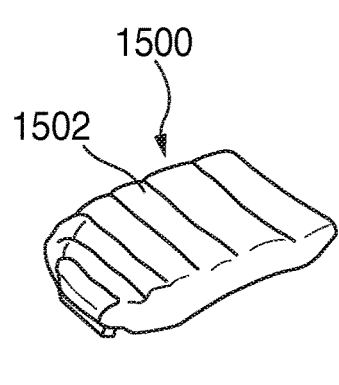 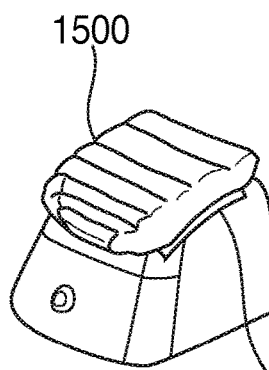 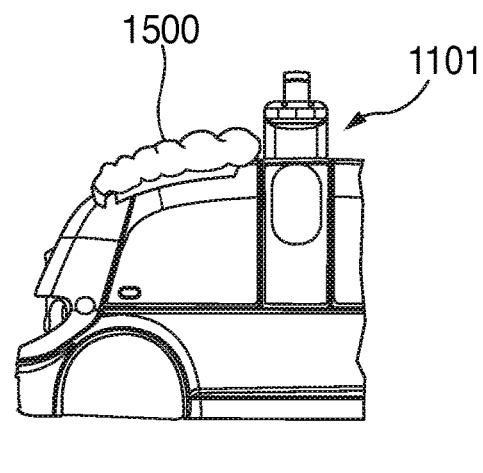
FIG. 22　　FIG. 23　　FIG. 24
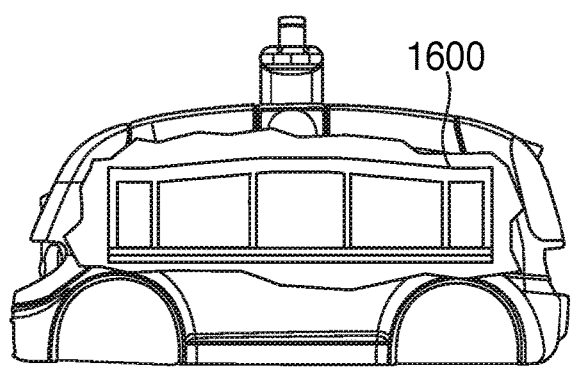
FIG. 25

HARDWARE AND SOFTWARE MECHANISMS ON AUTONOMOUS VEHICLE FOR PEDESTRIAN SAFETY

CROSS-REFERENCE TO RELATED APPLICATIONS

This application is a divisional of and claims the benefit of priority to U.S. patent application Ser. No. 16/048,797, filed on Jul. 30, 2018, which application claims priority to U.S. Provisional Application No. 62/538,538, filed on Jul. 28, 2017, the entirety of which applications are incorporated herein by reference.

FIELD OF THE TECHNOLOGY

The present application relates to autonomous vehicles, and in particular, to autonomous vehicles including safety features to protect pedestrians struck by the autonomous robot vehicles.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

Accordingly, there is a need for reliable and efficient means to avoid collision with pedestrians or means to protect pedestrians in a case of unavoidable collision with the fully-autonomous and/or semi-autonomous robots.

SUMMARY

This disclosure relates to a fully-autonomous and/or semi-autonomous robot fleet and, in particular, to a fleet of robot vehicles for transporting or retrieving deliveries in either unstructured outdoor environment or closed environments.

In accordance with an embodiment of the present disclosure, an autonomous robot vehicle includes a front side and an energy absorbing system. The front side includes a front bumper and a front face including a frame. The energy absorbing system includes an energy absorbing member mounted on the frame, and an inflatable airbag. The energy absorbing member is configured to reduce impact on an object struck by the autonomous robot vehicle. The inflatable airbag is mounted on the front side of the autonomous robot vehicle such that when the inflatable airbag is deployed, the inflatable airbag is external to the autonomous robot vehicle.

In an embodiment, the energy absorbing member may be formed of a compressible material.

In an embodiment, the energy absorbing member may be formed of foam.

In another embodiment, the frame may include a support member configured to support and retain the energy absorbing member in a cavity defined in the frame.

In yet another embodiment, the energy absorbing member may have a profile conforming to a contour of the front side of the autonomous robot vehicle.

In still yet another embodiment, the front side of the autonomous robot vehicle may define a recess including cavities having an open end and a closed end. The front side may further include a headlamp assembly behind the closed.

In an embodiment, the front bumper of the front side may include a crash beam providing structural integrity to the front side of the autonomous robot vehicle.

In yet another embodiment, the front bumper may further include a second energy absorbing member coupled with the crash beam.

In an embodiment, the inflatable airbag may be mounted on a top surface of the front side.

In another embodiment, the inflatable airbag may include a plurality of chambers sequentially inflatable. Alternatively, each chamber may be inflatable independently of the other chambers.

In yet another embodiment, the energy absorbing system may further include detection sensors configured to detect obstacles in a direction of travel of the autonomous robot vehicle.

In yet another embodiment, the energy absorbing system may further include an inflation unit configured to supply compressed gas to the inflatable airbag.

In still yet another embodiment, the energy absorbing system may further include a computer system configured to receive input signals from the detection sensors providing obstacle information, and send an actuation signal to the inflation unit which then supplies compressed gas to the inflatable airbag.

In still yet another embodiment, the energy absorbing system may further include an interior airbag disposed within a storage compartment of the autonomous robot vehicle.

In accordance with another embodiment of the present disclosure, an autonomous robot vehicle includes a conveyance system, a vehicle controller configured to control the conveyance system, and an energy absorbing system including detection sensors, an inflatable airbag mounted on a front side of the autonomous robot vehicle such that the inflatable airbag is external to the autonomous robot vehicle when deployed, an inflation unit configured to supply compressed gas to the inflatable airbag, and a computer system configured to receive input signals from the detection sensors, and send an actuation signal to the inflation unit, which actuates the inflation unit to supply compressed gas to the inflatable airbag.

In an embodiment, the energy absorbing system may further include an energy absorbing member mounted in a front side of the autonomous robot vehicle.

In another embodiment, the computer system may be configured to send control signals to the conveyance system to apply brakes to reduce speed or steer the autonomous robot vehicle away from the obstacles in the direction of travel.

In yet another embodiment, the energy absorbing system may further include an interior airbag disposed within a storage compartment of the autonomous robot vehicle.

In accordance with another embodiment of the present disclosure, an autonomous robot vehicle includes a front side including a front bumper and a front face including a frame, and an energy absorbing system including an energy absorbing member mounted on the frame of the front face. The energy absorbing member is configured to reduce impact on an object struck by the autonomous robot vehicle. The energy absorbing member extends between a top portion of the front side and the front bumper.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which:

FIG. 22 is a perspective view of an airbag for use with the robot vehicle of FIG. 13 in accordance with another embodiment of the present disclosure;

FIG. 23 is a perspective view of the airbag of FIG. 22, illustrating the airbag mounted on the robot vehicle of FIG. 13;

FIG. 24 is a side cross-sectional view of the airbag of FIG. 22, illustrating the airbag mounted on the robot vehicle of FIGS. 13; and FIG. 25 is a side cross-sectional view of an airbag for use with the robot vehicle of FIG. 13 in accordance with another embodiment of the present disclosure.

DETAILED DESCRIPTION

Figure 1:
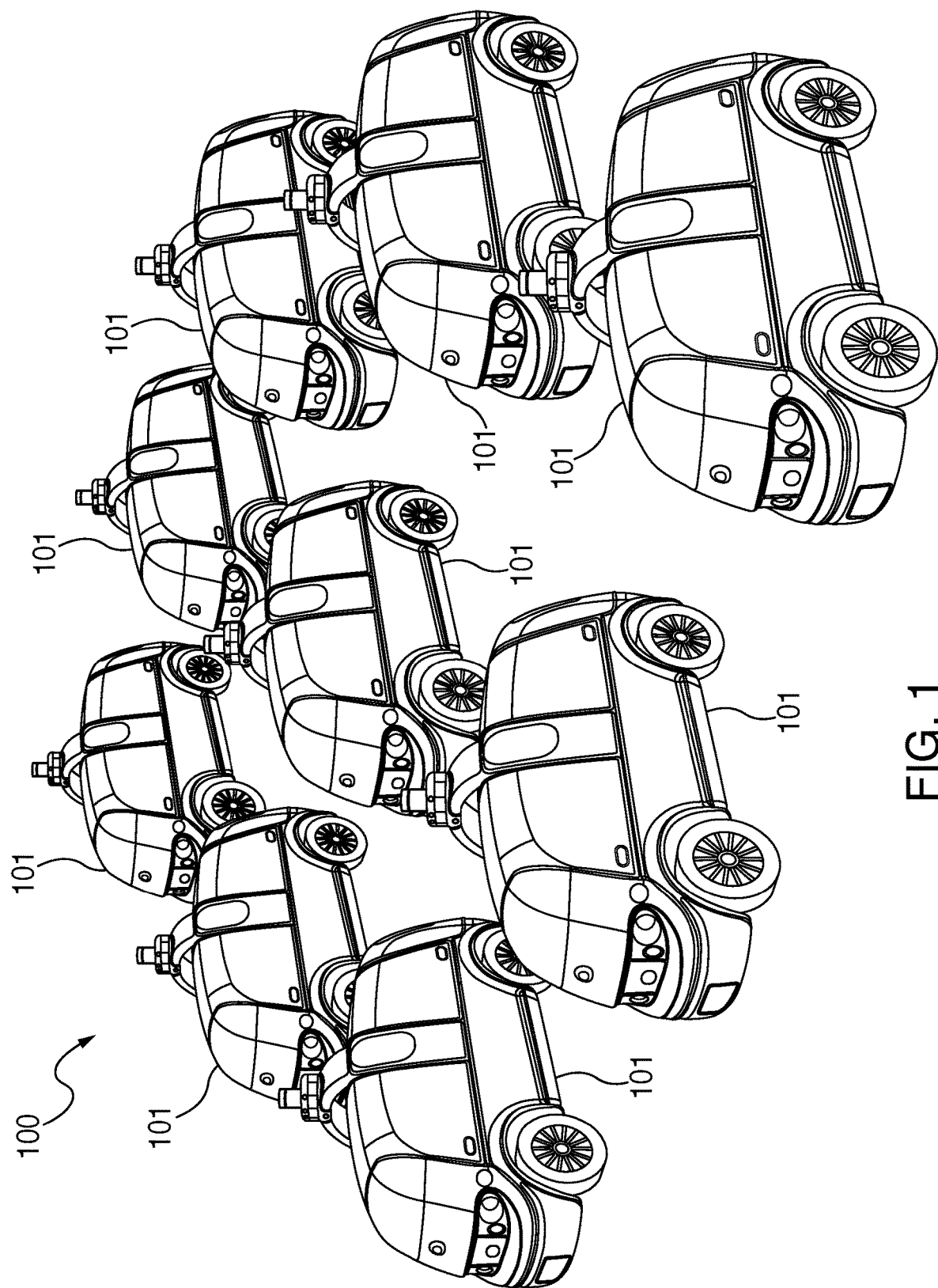
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving deliveries in either open unstructured outdoor environments or closed environments.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of land vehicles operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), and unmanned hovercraft.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In some embodiments, the robot fleet is fully-autonomous.

In some embodiments, the robot fleet is semi-autonomous. In some embodiments, it may be necessary to have human interaction between the robot 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet is configured for hover travel as an over-land hovercraft and is configured with a working speed range from 1.0 mph to 60.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-*a*, 100-*b*).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
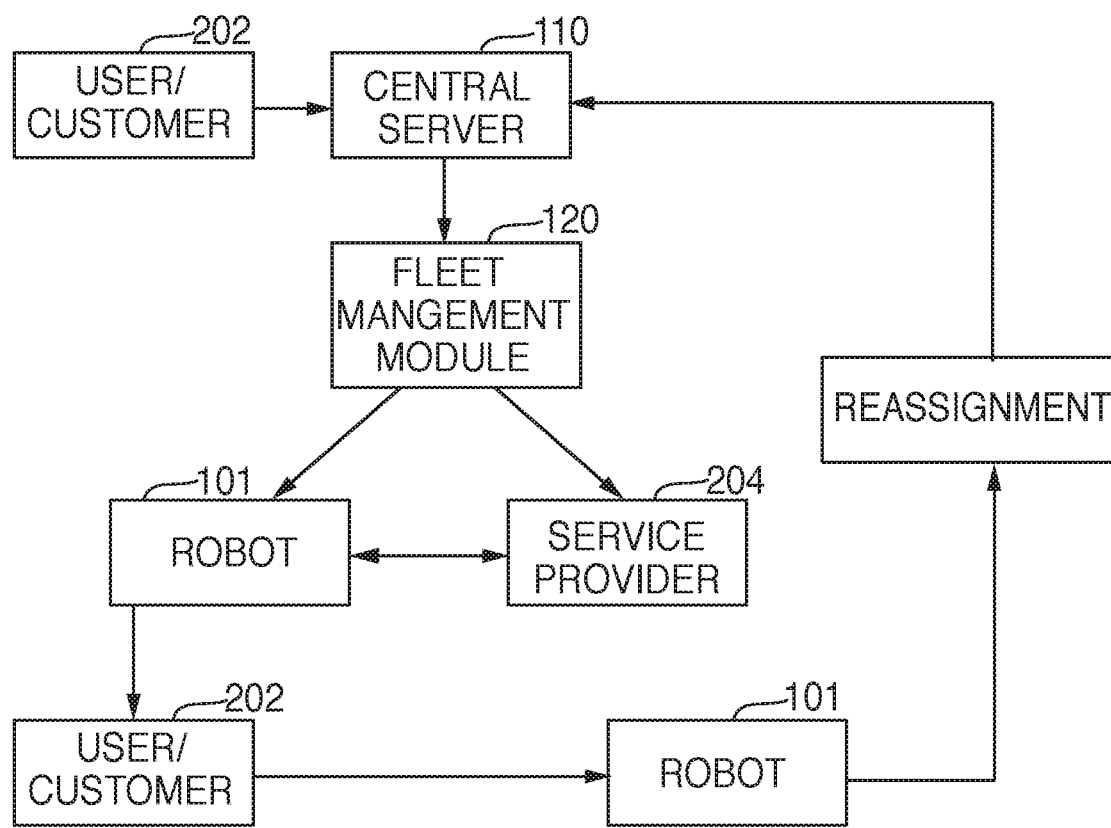
FIG. 11 is an exemplary flowchart representation of the logic for a fleet management control module associated with a central server for the robot fleet.

As illustrated in FIG. 11, in one embodiment, a request is sent to a main server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or robots 101 in the fleet. The best appropriate robot(s) in the fleet within the geographic region and typically closest to the service provider, is then assigned the task, and the provider of the service 204 then interacts with that robot 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
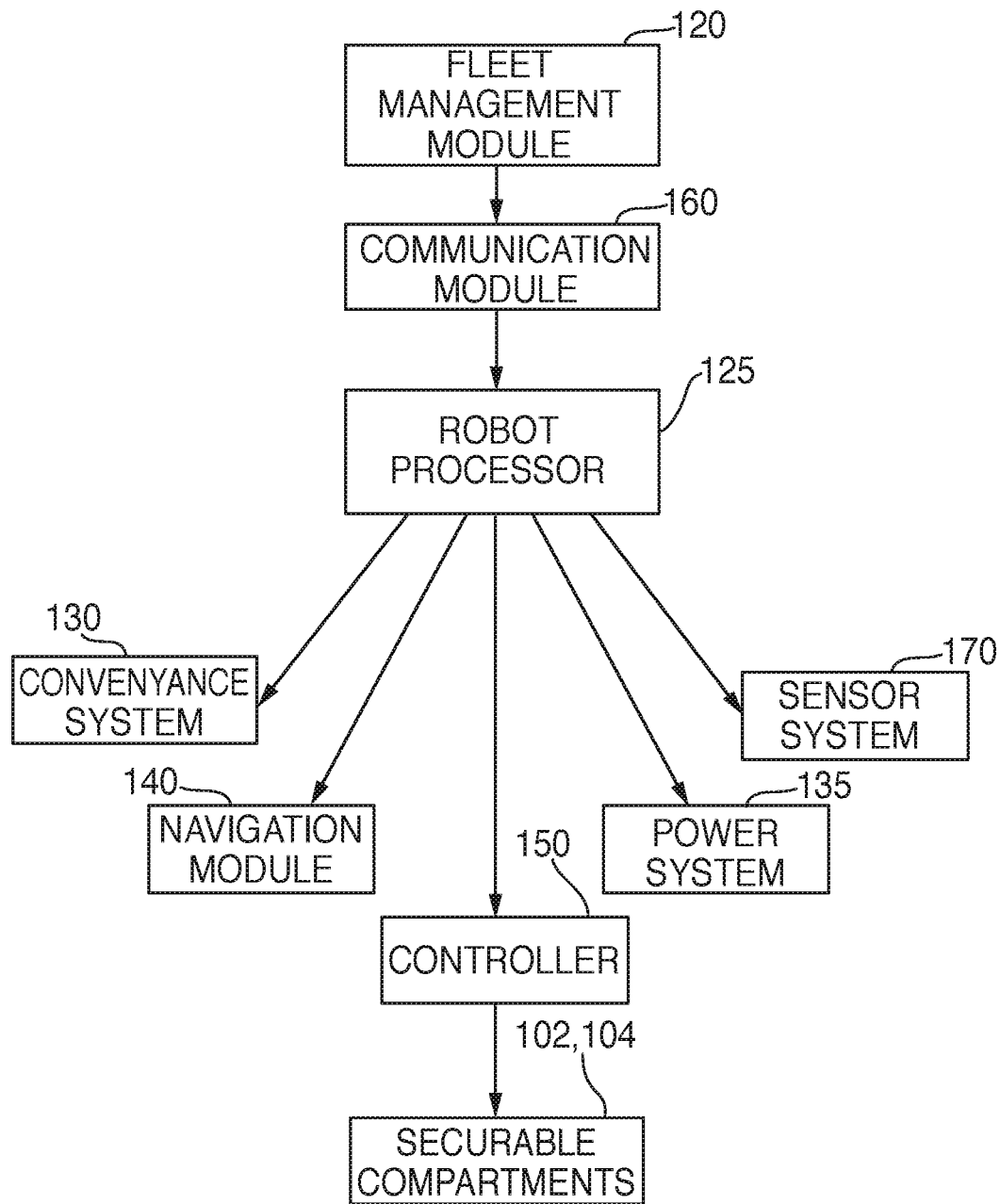
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module coordinates the activity and positioning of each robot in the fleet. The fleet management module also communicates with vendors/businesses 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land. Typical vehicles include cars, wagons, vans, unmanned motor vehicles (e.g., tricycles, trucks, trailers, buses, etc.), and unmanned railed vehicles (e.g., trains, trams, etc.).

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, rotors, blowers, brakes, etc.

In some embodiments, the robot fleet is configured for hover travel as an over-land hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

Securable Compartments

Figure 2:
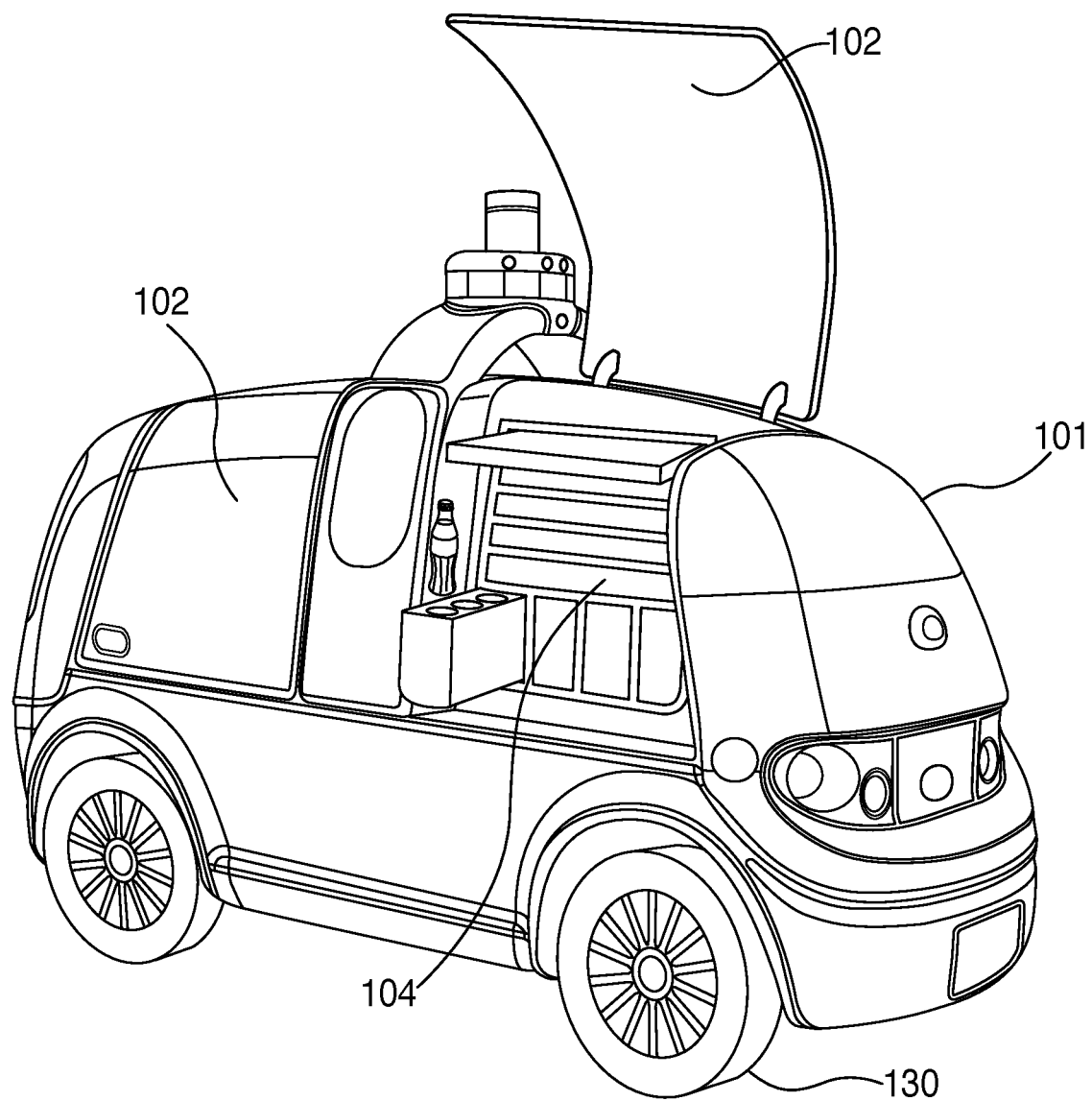
FIG. 2 is an exemplary ISO view of a robot vehicle, part of an autonomous robot fleet, illustrating securable compartments within the vehicle.
Figure 3:
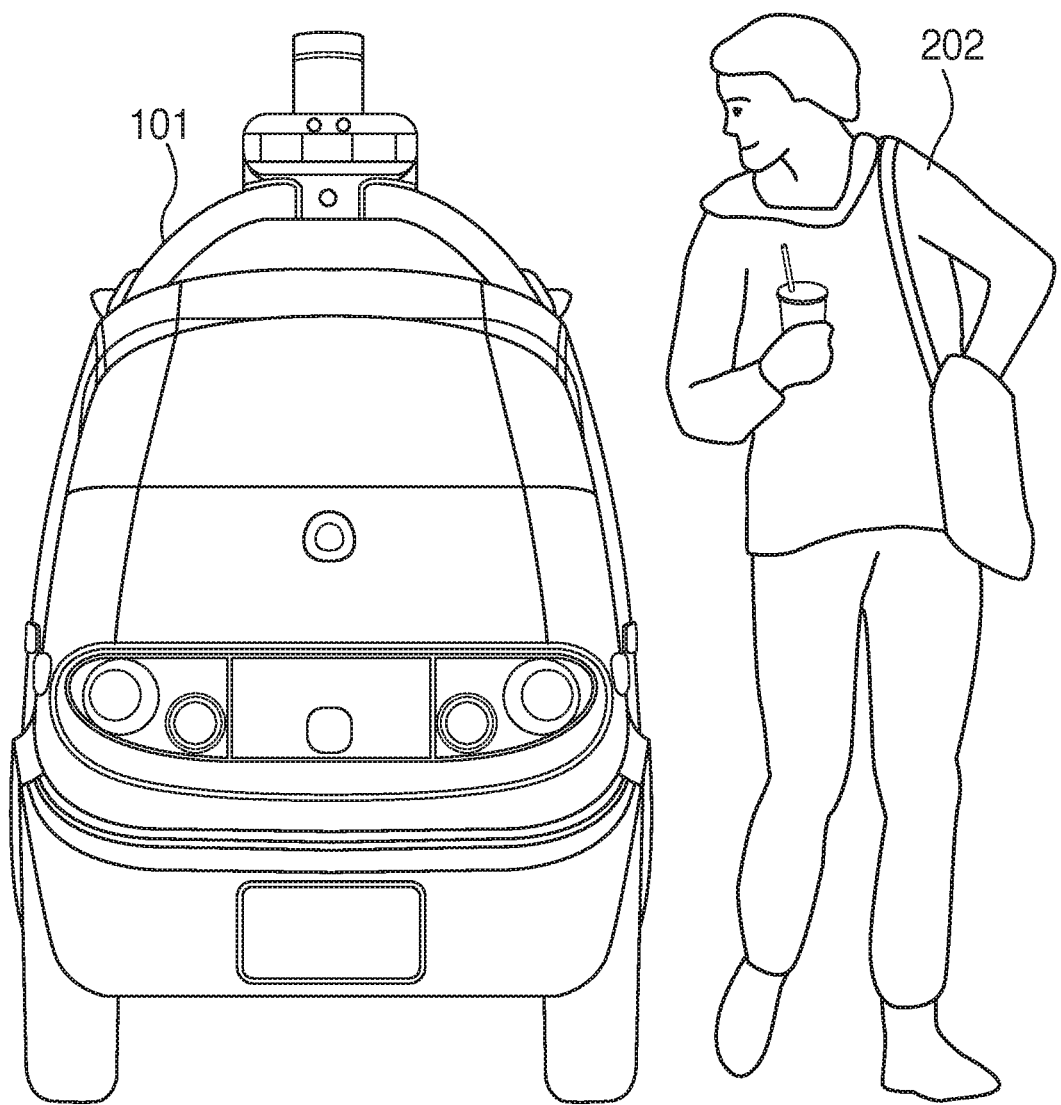
FIG. 3 is an exemplary front view of a robot vehicle, part of an autonomous robot fleet, shown in comparison to the height of an average person.
Figure 4:
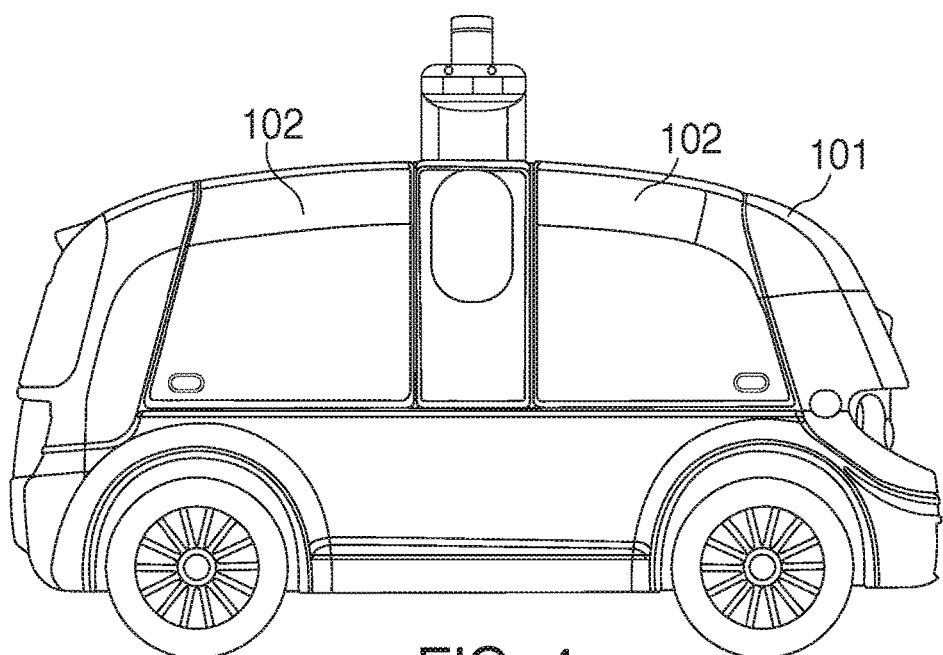
FIG. 4 is an exemplary right side view of a robot vehicle, part of an autonomous robot fleet, illustrating a configuration with two large side doors, each enclosing securable compartments.
Figure 5:
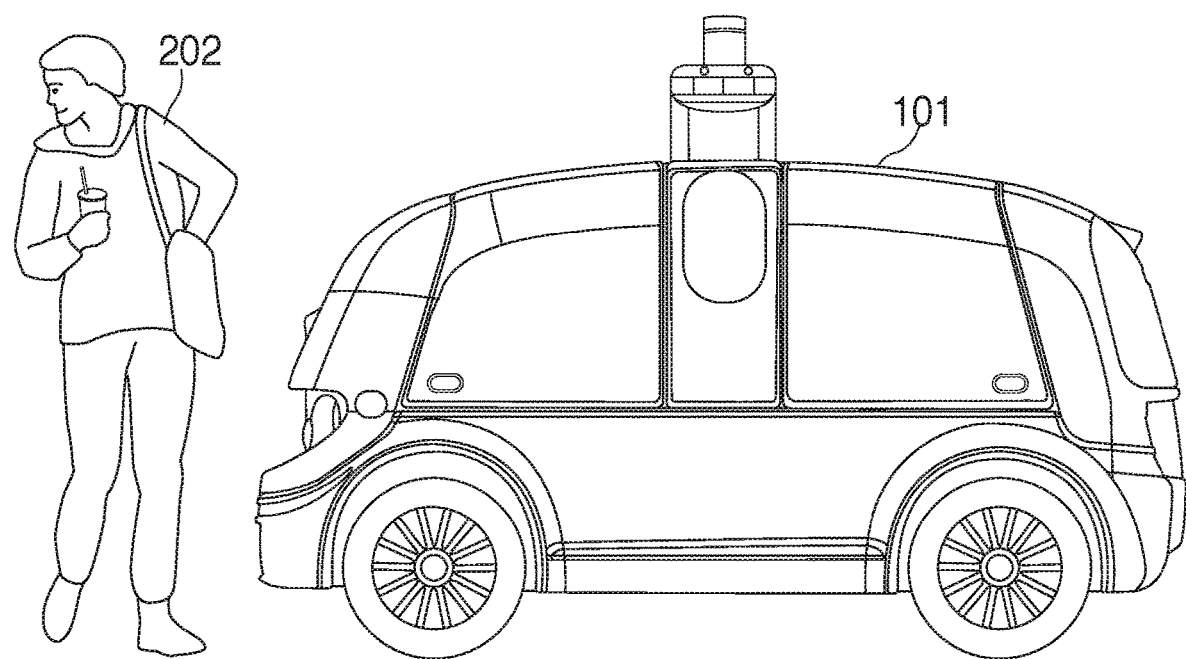
FIG. 5 is an exemplary left side view of a robot vehicle, part of an autonomous robot fleet, shown in comparison to the height of an average person.
Figure 6:
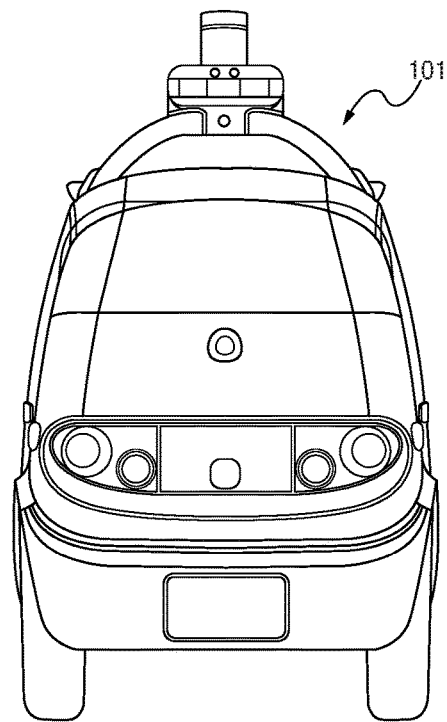
FIG. 6 is an exemplary rear view of a robot vehicle, part of an autonomous robot fleet.
Figure 7:
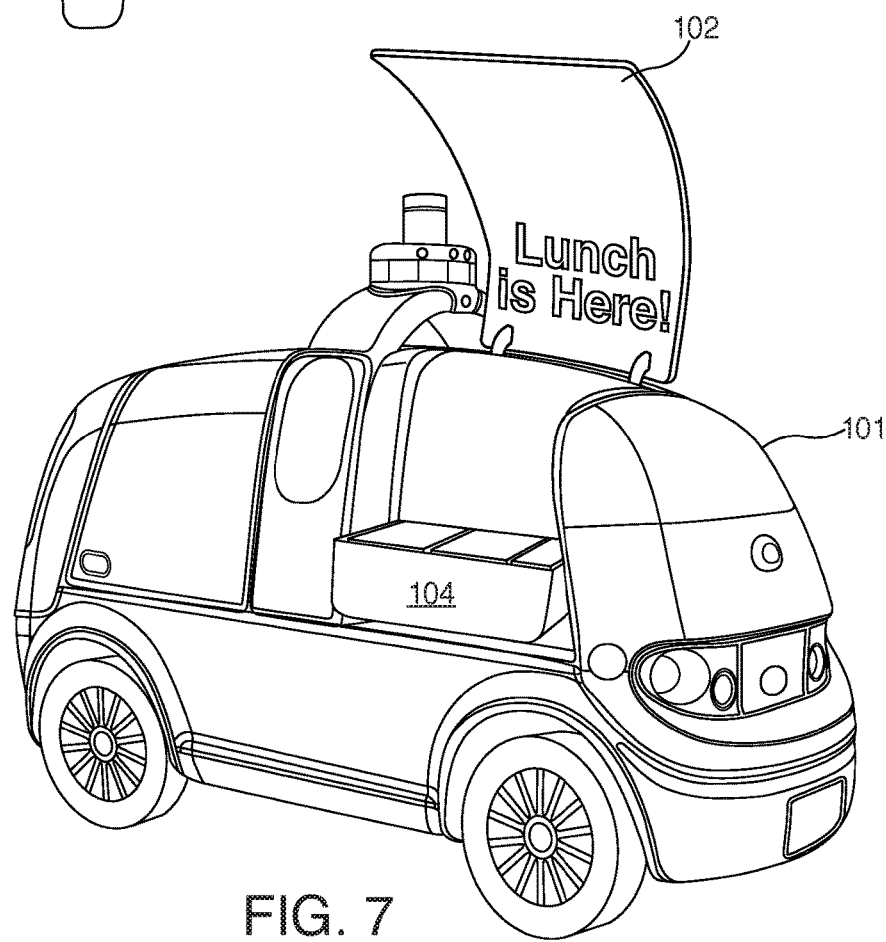
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
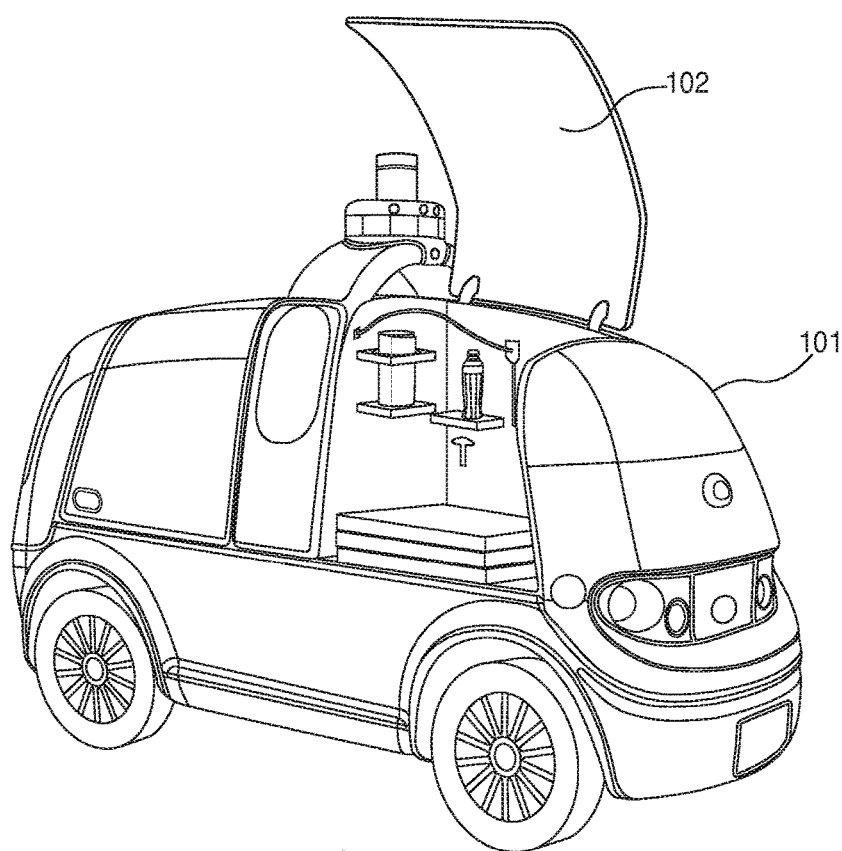
FIG. 8 is an exemplary ISO view of a robot vehicle, part of an autonomous robot fleet, illustrating an autonomous pizza delivery vehicle for any branded company.
Figure 9:
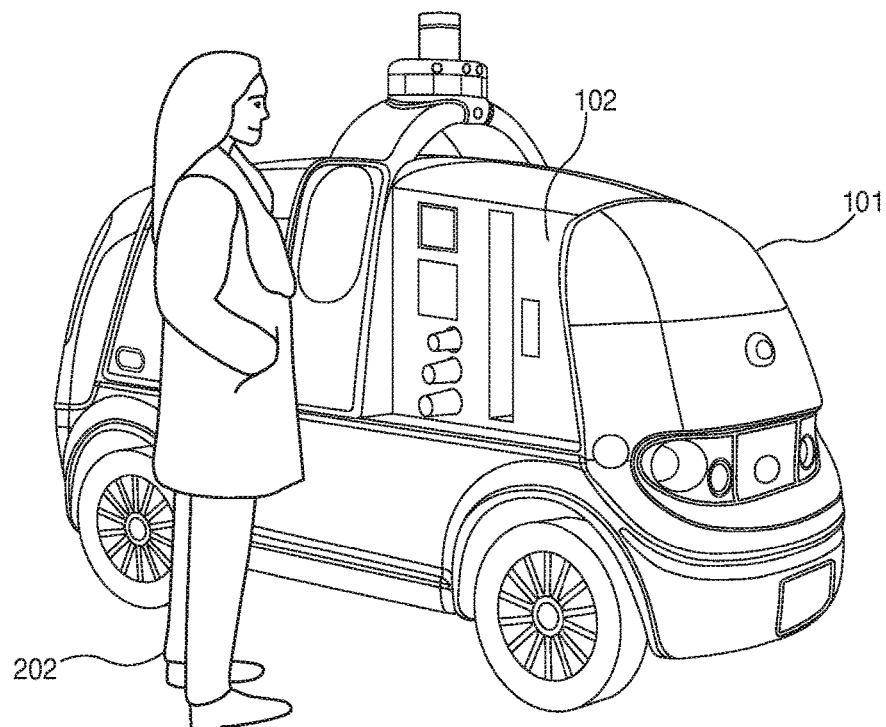
FIG. 9 is an exemplary ISO view of a robot vehicle, part of an autonomous robot fleet, illustrating an autonomous coffee delivery vehicle for any branded company.
Figure 10:
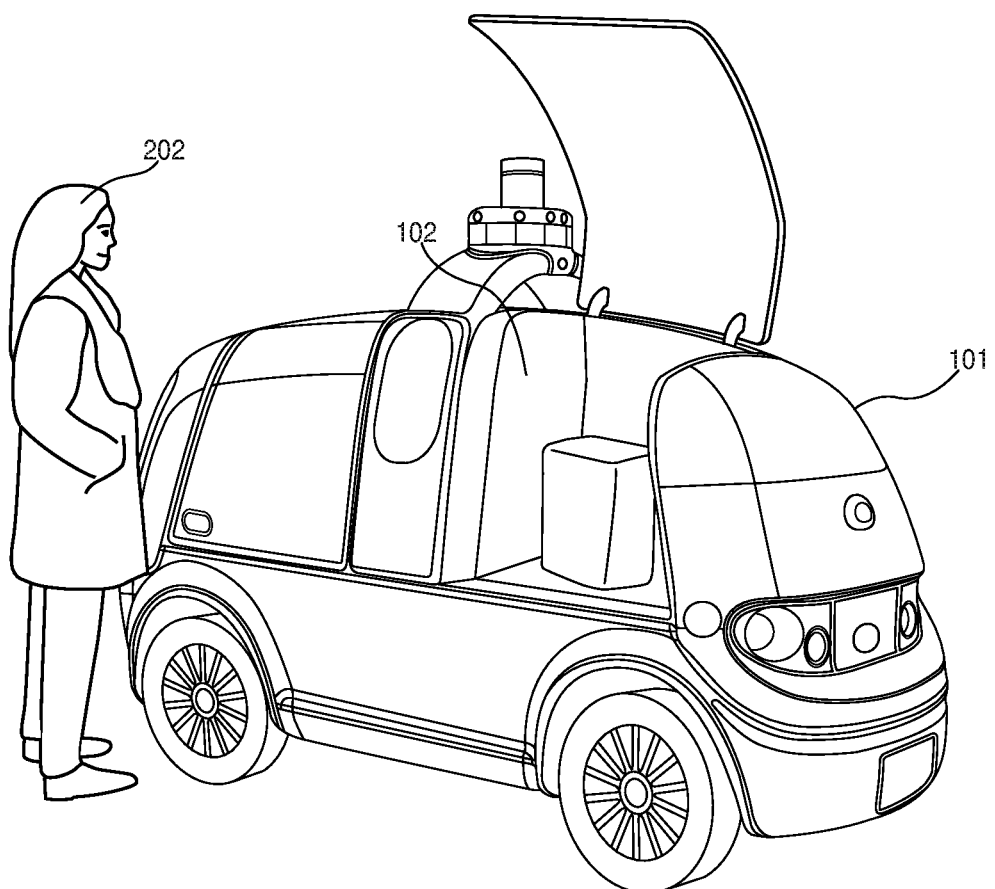
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized, Each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:
1. The customer can be given a PIN (e.g., 4 digit number) when they make their initial request/order. They can then enter this pin at the robot using the robot touchscreen or a keypad.
2. The customer can verify themselves using their mobile phone and an RFID reader on the robot.
3. The customer can verify themselves using their voice and a personal keyword or key phrase they speak to the robot.
4. The customer can verify themselves through their face, a government ID, or a business ID badge using cameras and facial recognition or magnetic readers on the robot.
5. The customer can verify themselves using their mobile phone; by pushing a button or predetermined code on their phone (and the system could optionally detect the customer is near the robot by using their GPS position from phone)

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

Safety Features

Figure 13:
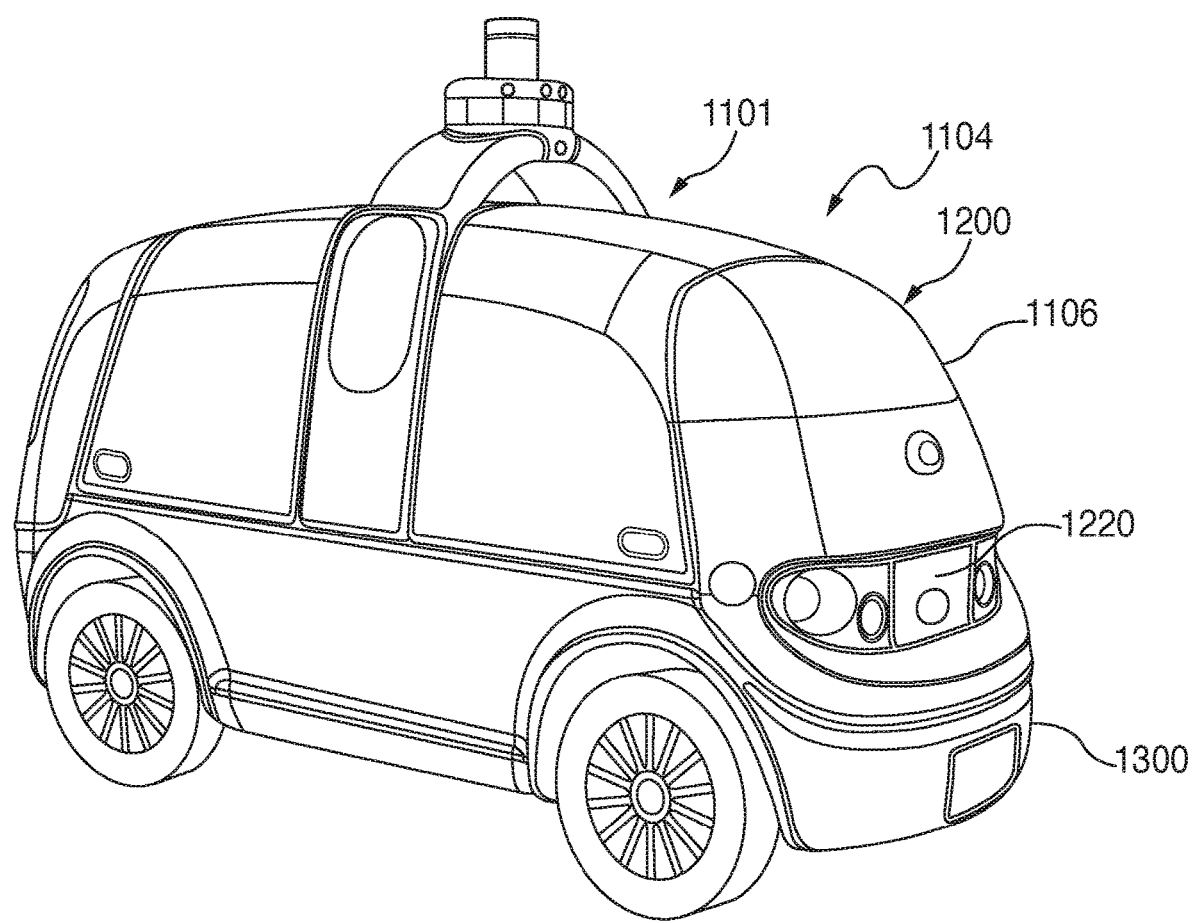
FIG. 13 is a perspective view of a robot vehicle in accordance with an embodiment of the present disclosure.
Figure 14:
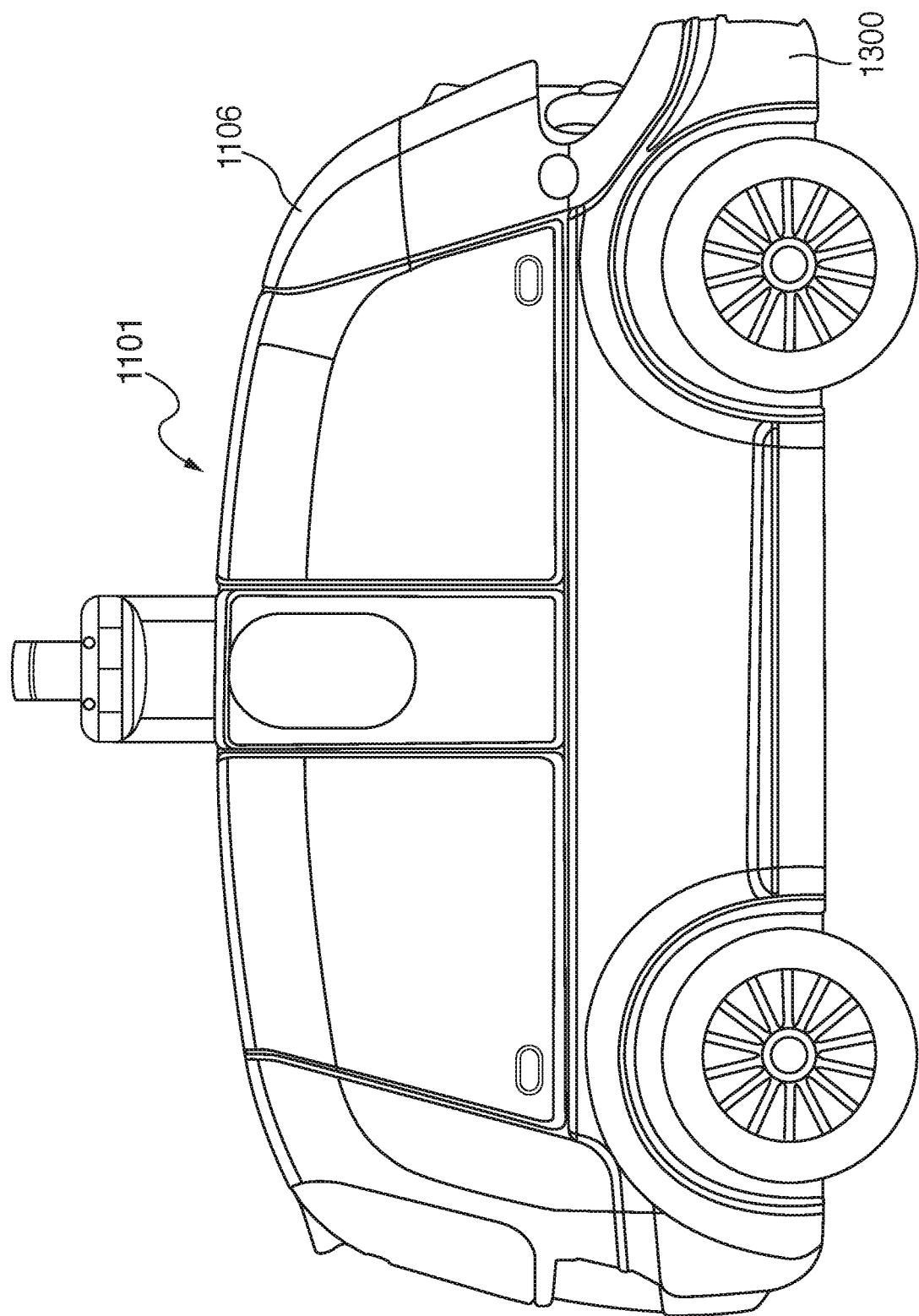
FIG. 14 is a side view of the robot vehicle of FIG. 13.
Figure 15:
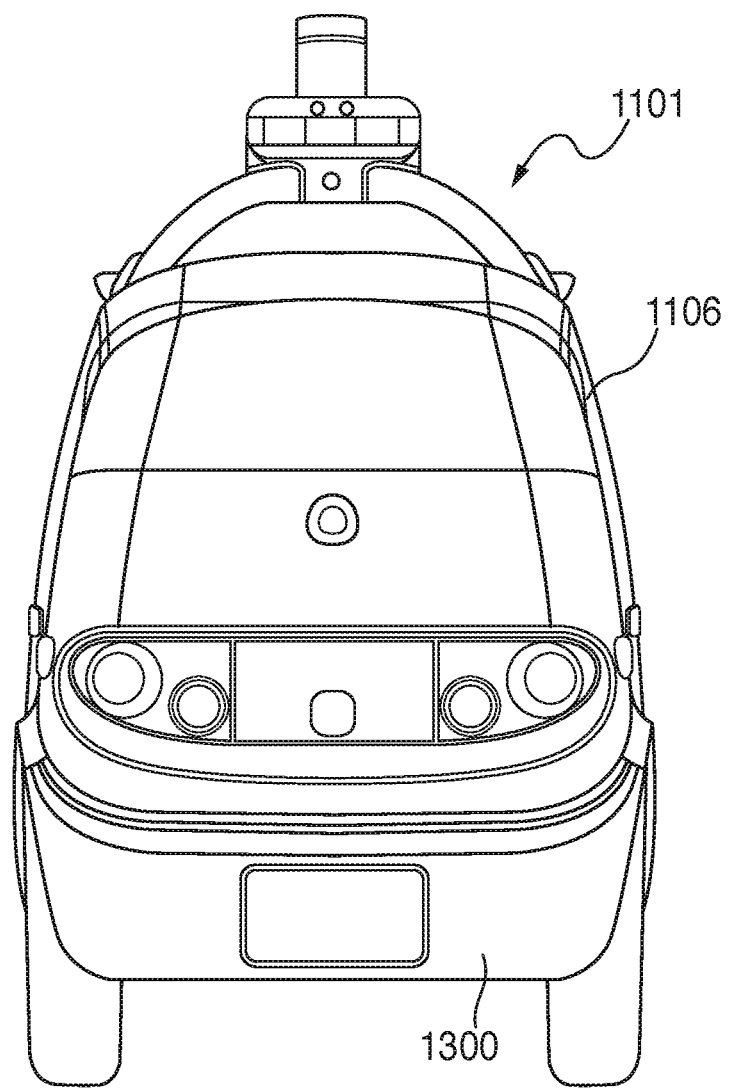
FIG. 15 is a front view of the robot vehicle of FIG. 13.

With reference now to FIGS. 13-15, a robot vehicle equipped with an energy absorbing system including energy absorbing members to reduce impact on objects that come in contact with the robot vehicle and/or the contents of a storage compartment of the robot vehicle in accordance with an embodiment of the present disclosure is shown generally as a robot vehicle 1101. The robot vehicle 1101 includes a vehicle controller, the conveyance system 130 (FIG. 12), and an energy absorbing system 1200.

The vehicle controller may be embodied as analog, digital, or mixed analog and digital processing circuitry and memory that direct the operation of the robot vehicle 1101 and the electromechanical conveyance system 130 of the robot vehicle 1101. The vehicle controller is an embedded real-time control system in which control outputs are produced in response to control input conditions. The vehicle controller is configured to use feedback from detection sensors and the conveyance system 130, for example, to develop an appropriate response when the robot vehicle 1101 encounters an obstacle such as, e.g., a pedestrian. The vehicle controller may be integrated with the conveyance system 130 of the robot vehicle 1101 in any suitable manner to permit the vehicle controller to control the operations of the robot vehicle 1101, including the acceleration, braking, or turning. The vehicle controller may be electrically, mechanically, and electromechanically integrated with the conveyance system 130 and the other elements of the robot vehicle 1101.

The conveyance system 130 may be embodied as the powertrain and associated electrical, mechanical, hydraulic, electromechanical, control, and diagnostic systems of the robot vehicle 1101. Thus, the conveyance system 130 may include one or more engines, motors, transmissions, steering, braking, and other systems to control the movement of the robot vehicle 1101 on surface streets, parking lots, off-road surfaces, etc. The conveyance system 130 operates the robot vehicle 1101 at the direction of the vehicle controller.

The energy absorbing system 1200 is configured to reduce impact on the object that comes in contact with the robot vehicle 1101, as well as on items in the storage compartment 102 (FIG. 2) of the robot vehicle 1101, in an event of a collision. The energy absorbing system 1200 includes an energy absorbing member 1204 configured to reduce impact on an external object such as, e.g., pedestrian, in the event of a collision, an inflation unit, detection sensors, and a computer system capable of receiving and processing input information and ultimately generating an output signal initiating a response.

The detection sensors of the energy absorbing system 1200 may include various sensors, such as, for example, cameras, three-dimensional (3D) laser scanners, laser illuminated detecting and ranging sensors (LIDAR), radar, range scanners, 3D depth sensing devices, which may be relied upon to analyze the surrounding environment, develop control signals for operation of the conveyance system 130, detect an occurrence of an event, e.g., a car accident, and/or other actions. The detection sensors may be, e.g. a radiant energy detector including infrared, radar, laser radar, laser, and microwave, that is sonic detector including ultrasonic and acoustic detection devices, wherein laser radar is optionally used because of the narrow beam width and angular resolution, as the laser radar importantly gives more specific and precise information of detected obstacle's direction, distance, size and relative speed. One such system may include a radar detection device transmitting and receiving signals at a rate in the range of, e.g., 1 and 1,000,000,000, samples per second. The data obtained by the detection sensors is processed by the computer system to determine the time of an imminent collision.

The computer system through simple known algorithms may predict when an accident or collision is imminent. Once the prediction has been made, the computer system may further assess the time necessary, i.e., a minimum allowable time window, to maximize the protective effect. The computer system may calculate anticipated collision time on the basis of speed, distance, direction and predetermined minimum allowable time window.

Figure 18:
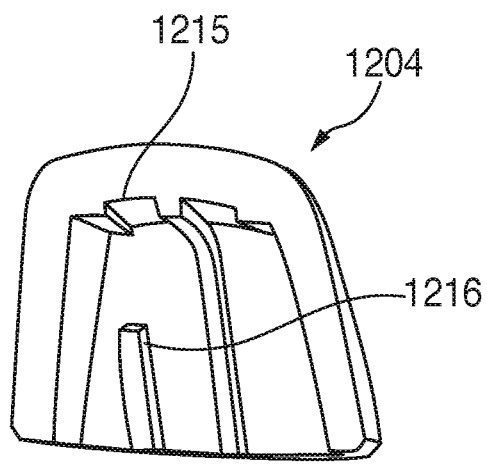

With particular reference to FIGS. 13-16, the robot vehicle 1101 has a front side 1104 including the energy absorbing system 1200 in accordance with an embodiment of the present disclosure. The front side 1104 of the robot vehicle 1101 includes a front face 1106 and a front bumper 1300. The front face 1106 includes a frame 1202 defining a cavity 1205 dimensioned to receive an energy absorbing member 1204 configured to reduce impact on an object such as, e.g., pedestrian, that comes in contact with the robot vehicle 1101 in the event of a collision. For example, the energy absorbing member 1204 may be formed of a compressible and/or resilient material such as foam, rubber, polymer, gel, or any combination thereof. The frame 1202 includes a support member 1212 configured to provide support to the energy absorbing member 1204 and retain the energy absorbing member 1204 in the cavity 1205. In addition, the energy absorbing member 1204 may include engagement tabs 1216 (FIG. 18) configured to be secured in grooves (not shown) defined in the support member 1212. Further, the energy absorbing member 1204 defines engagement grooves 1215 configured to securely engage respective clips 1210 on the frame 1202. The engagement grooves 1215 and the clips 1210 may include, e.g., dovetail configuration, to facilitate slidable engagement of the energy absorbing member 1204 with the front side 1104 of the robot vehicle 1101.

The energy absorbing member 1204 may be shaped to conform to the contour of the front side 1104 of the robot vehicle 1101. For example, the energy absorbing member 1204 may include a bend 1214 to conform to the aerodynamic profile of the front side 1104 of the robot vehicle 1101. Further, a film or a coating may be provided over the energy absorbing member 1204 in order to provide uniform color or texture with the rest of the front side 1104.

Figure 16:
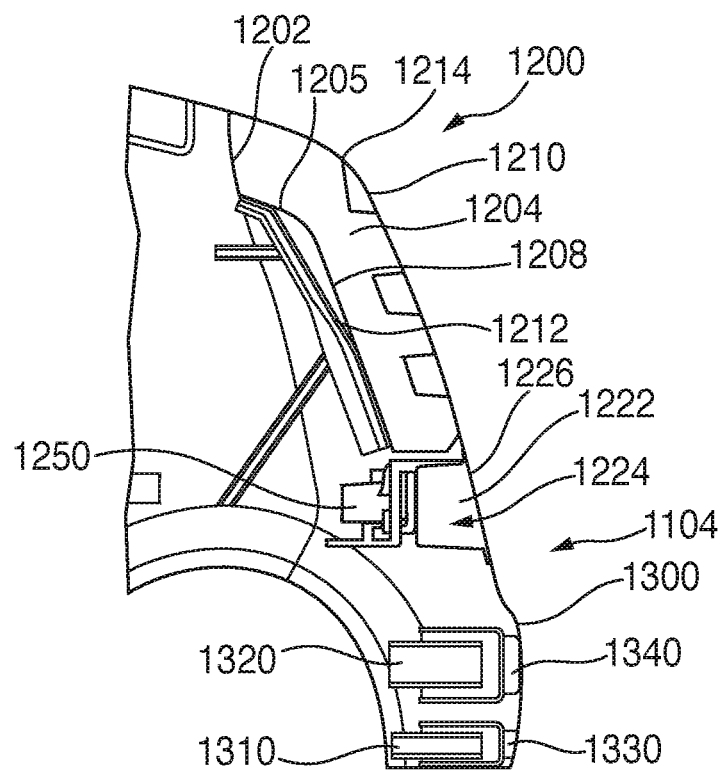
FIG. 16 is a partial, side cross-sectional view of the robot vehicle of FIG. 14.
Figure 17:
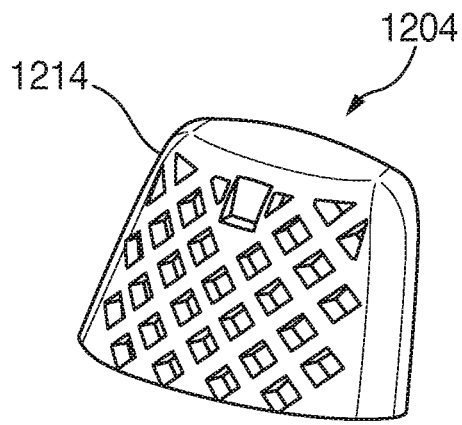
FIGS. 17 and 18 are perspective views of an energy absorbing member for use with the robot vehicle of FIG. 13.

With particular reference to FIGS. 13 and 16, the front side 1104 of the robot vehicle 1101 defines a recess 1220 including headlamp buckets 1222 defining respective cavities 1224. Each cavity 1224 is covered by a lens 1226. A headlamp assembly 1250 is disposed on an opposing side of the cavity 1224, i.e., spaced apart, from the lens 1226. Under such a configuration, injury or trauma to the pedestrian caused by the headlamp assembly 1250 may be reduced in the event of a collision.

With continued reference to FIG. 16, the front bumper 1300 has first and second crash beams 1310, 1320 configured to provide structural integrity in the event of a collision with, e.g., a vehicle or a guardrail. The first and second crash beams 1310, 1320 are coupled with respective first and second energy absorbing members 1330, 1340 such that in the event of a collision with a pedestrian, the first and second energy absorbing members 1330, 1340 reduce impact on the pedestrian, which, in turn, may reduce injury or trauma to the pedestrian.

Figure 19:
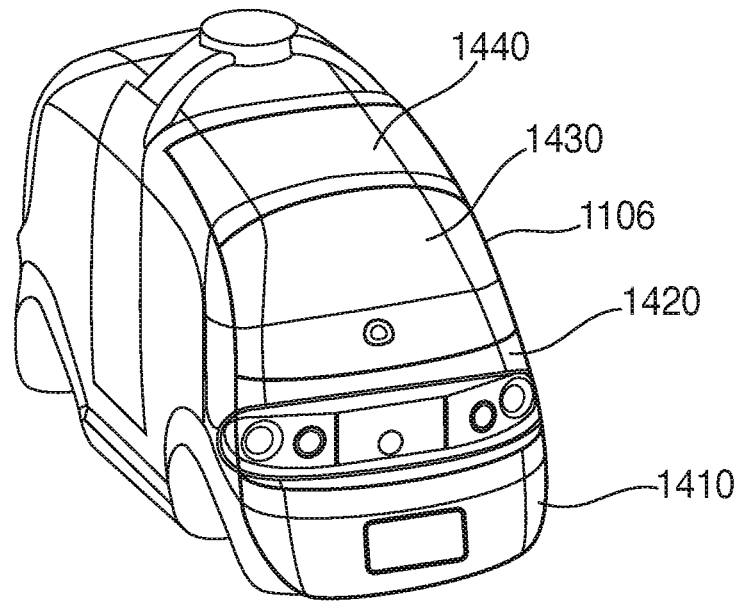
FIG. 19 is a perspective view of the robot vehicle of FIG. 13, illustrating various impact zones.
Figure 20:
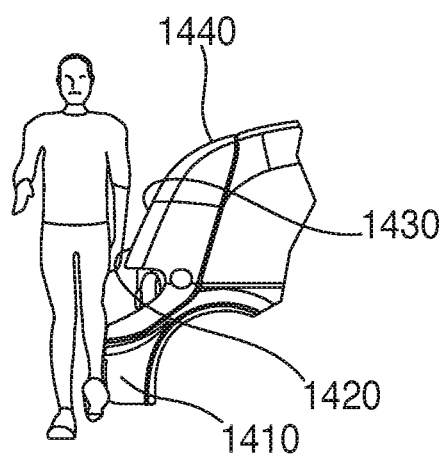
FIGS. 20 and 21 are side views of the robot vehicle of FIG. 13, illustrating impact zones with respect to an adult and a child, respectively.
Figure 21:
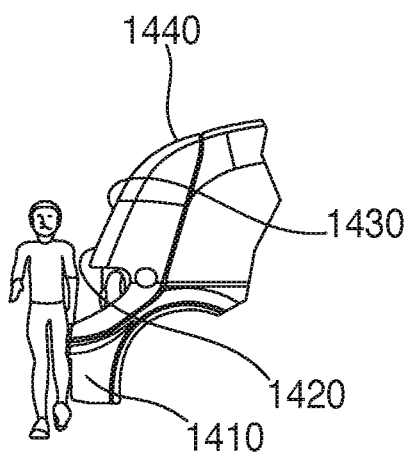

With reference now to FIGS. 19 and 20, the front face 1106 of the robot vehicle 1101 may be divided into first, second, third, and fourth impact zones 1410, 1420, 1430, 1440. In particular, in the event of a collision with a pedestrian, the first impact zone 1410 comes in contact with legs of a child or lower legs of an adult. As discussed hereinabove, the first and second energy absorbing members 1330, 1340 may reduce impact on the pedestrian. The second impact zone 1420 comes in contact with upper legs of an adult and upper torso of a child in the event of a collision. The energy absorbing member 1204 may be dimensioned to extend to the second impact zone to reduce impact on the pedestrian. The third impact zone 1430 comes in contact with the torso of an adult and a head of a child in the event of a collision. The third impact zone 1430 includes the energy absorbing member 1204 to reduce impact on the pedestrian that comes in contact with the robot vehicle 1101. Generally, when a pedestrian is struck by a moving vehicle, the impact causes the pedestrian to rotate about a point of impact such that the head of the pedestrian hits, e.g., the windshield or hood, of the vehicle. In a case of the robot vehicle 1101, an adult pedestrian would initially come in contact with the first impact zone 1410 and would rotate by the impact such that the head of the adult pedestrian would come in contact with the fourth impact zone 1440, which may potentially cause head injuries. To this end, an additional energy absorbing member may be utilized to protect the head of the pedestrian in the event of a collision.

With reference now to FIGS. 22-24, an energy absorbing member for use with the robot vehicle 1101 is generally shown as an airbag 1500. As discussed hereinabove, the airbag 1500 may be disposed at or adjacent the fourth impact zone 1440 (FIG. 19) to protect, e.g., a head, of a pedestrian in the event of a collision. The airbag 1500 may be tailored to the size of the fourth impact zone 1440. For example, the airbag 1500 may include a plurality of chambers 1502 which may sequentially inflate from the front to back. Alternatively, each of the plurality of chambers 1502 may independently inflate. The airbag 1500 may be disposed in a folded state in which the airbag 1500 is flat against a top surface of the front side 1104, i.e., the fourth impact zone 1440. For example, the airbag 1500 may be covered with a film or a coating for uniform color and texture with the rest of the front face 1106.

The energy absorbing system 1200 further includes an inflator unit that responds to a control signal generated by the computer system. The inflator unit has a volume of inflation gas contained in an inflator. The inflator has an electronically controlled valve that is activated by the computer system, releasing compressed gas into the airbag 1500. When a collision or alternatively, imminent collision is detected, compressed gas is supplied to the airbag 1500.

With reference now to FIG. 25, it is also envisioned that an airbag 1600 may also be utilized to protect the contents loaded in the storage compartment 102 (FIG. 2) of the robot vehicle 1101. As discussed hereinabove, when a collision or alternatively, imminent collision, is detected compressed gas is supplied to the airbag 1600 to inflate the airbag 1600.

Speed information may be provided by a speedometer, for example, and pedestrian information may be obtainable from the detection sensors mounted at various locations in the robot vehicle 1101. A plurality of detection sensors may surround the perimeter of the robot vehicle 1101. The detection sensors may be coupled with, e.g., a steering mechanism, of the robot vehicle 1101 such that as the steering wheel turns, the detection sensors are correspondingly turned to maintain its target direction generally parallel with the direction of the front wheel of the robot vehicle 1101. This results in the forward beam inspecting the vicinity of the turn into which the robot vehicle 1101 embarks.

The computer system receives input signals from the detection sensors. The detection sensors transmit and receives information concerning the pedestrians or objects via the transmitted and reflected signals. The signals are sampled by the computer system at a high rate in order to ensure the minimum allowable time (collision unavoidable time) window is satisfactorily set. The signals provide the computer system with information relating to the relative distance between the robot vehicle 1101 and the object or obstacle such as, e.g., a pedestrian.

Each detection sensor scans the area to the front of the robot vehicle 1101 and transmits to the computer system, e.g., speed, direction and distance data of any obstacle in the ranges of distance. The computer system calculates a collision unavoidable distance, determines the apparent time of imminent collision on the basis of the established minimum allowable time window, and generates a control signal. If the computer system determines that the collision is avoidable, the computer system may send a control signal to the conveyance system 130 to apply brakes to reduce speed and/or steer robot vehicle 1101 away from the object.

When the collision becomes imminent, unavoidable and inescapable, the control signal is sent from the computer system to the inflator unit. The inflation gas fills the airbag 1500 and/or the airbag 1600. The airbag 1500 is deployed externally to the robot vehicle 1101, and the airbag 1600 is deployed in the storage compartment 102 (FIG. 2) of the robot vehicle 1101 to protect the contents therein and absorb the energies associated with the impact power. These energies generally include kinetic, momentum and inertial energies among others. Even in the case of imminent collision, the computer system may send a control signal to the conveyance system 130 to apply brakes to reduce speed and/or steer the robot vehicle 1101 away from the object. It is also contemplated that a width of the robot vehicle 1101 may be optimized to provide the best response in turning and/or avoiding a collision. For example, a narrower robot vehicle may enable positioning the robot vehicle slightly closer to the road median, away from parked cars, cyclists, pedestrians, Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure.

Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

What is claimed is:

1. An autonomous robot vehicle comprising:
    a front side including a front bumper facing a first direction and a front face including a frame; and
    an energy absorbing system comprising an energy absorbing member mounted on the frame of the front face, wherein the energy absorbing member is configured to reduce impact on an object struck by the autonomous robot vehicle, and wherein the energy absorbing member faces the first direction and extends between a top portion of the front side and a top portion of a recess defining at least one cavity having a first side facing the first direction that is covered by a lens.

2. The autonomous robot vehicle according to claim 1, wherein the energy absorbing system further includes an inflatable airbag mounted on the front side of the autonomous robot vehicle, and wherein when the inflatable airbag is deployed, the inflatable airbag is external to the autonomous robot vehicle.

3. The autonomous robot vehicle according to claim 2, wherein the energy absorbing system further includes an interior airbag disposed within a storage compartment of the autonomous robot vehicle.

4. The autonomous robot vehicle according to claim 3, wherein the energy absorbing system further includes detection sensors configured to detect obstacles in a direction of travel of the autonomous robot vehicle.

5. The autonomous robot vehicle according to claim 4, wherein the energy absorbing system further includes an inflation unit configured to supply compressed gas to the inflatable airbag and to the interior airbag.

6. The autonomous robot vehicle according to claim 5, wherein the energy absorbing system further includes a computer system configured to receive input signals from the detection sensors providing obstacle information, and send an actuation signal to the inflation unit which then supplies compressed gas to the inflatable airbag and to the interior airbag.

7. The autonomous robot vehicle according to claim 1, wherein the energy absorbing member is compressible.

8. The autonomous robot vehicle according to claim 7, wherein the energy absorbing member is formed of foam.

9. The autonomous robot vehicle according to claim 1, wherein the front side further includes a headlamp assembly disposed on a second side of the at least one cavity opposite the lens.

10. The autonomous robot vehicle according to claim 1, wherein the front bumper of the front side includes a crash beam providing structural integrity to the front side of the autonomous robot vehicle.

11. The autonomous robot vehicle according to claim 10, wherein the front bumper further includes a second energy absorbing member coupled with the crash beam.

12. An energy absorbing system for a vehicle, comprising:
an energy absorbing member comprising a front face facing a first direction, wherein the energy absorbing member extends between a top portion of a front side of the vehicle and a top portion of a recess defining at least one cavity of the vehicle having a first side facing the first direction that is covered by a lens.

13. The energy absorbing system for the vehicle according to claim 12, wherein the energy absorbing system further includes an inflatable airbag mounted on the front side of the vehicle, and wherein when the inflatable airbag is deployed, the inflatable airbag is external to the vehicle.

14. The energy absorbing system for the vehicle according to claim 13, wherein the energy absorbing system further includes an interior airbag disposed within a storage compartment of the vehicle.

15. The energy absorbing system for the vehicle according to claim 14, wherein the energy absorbing system further includes detection sensors configured to detect obstacles in a direction of travel of the vehicle.

16. The energy absorbing system for the vehicle according to claim 15, wherein the energy absorbing system further includes an inflation unit configured to supply compressed gas to the inflatable airbag and to the interior airbag.

17. The energy absorbing system for the vehicle according to claim 16, wherein the energy absorbing system further includes a computer system configured to receive input signals from the detection sensors providing obstacle information, and send an actuation signal to the inflation unit which then supplies compressed gas to the inflatable airbag and to the interior airbag.

18. The energy absorbing system for the vehicle according to claim 12, wherein the energy absorbing member is compressible.

19. The energy absorbing system for the vehicle according to claim 18, wherein the energy absorbing member is formed of foam.

20. The energy absorbing system for the vehicle according to claim 12, wherein the front side further includes a headlamp assembly disposed on a second side of the at least one cavity opposite the lens.

21. An energy absorbing system, comprising:
an energy absorbing member comprising a front face facing a first direction, wherein the energy absorbing member extends between a top portion of a front side of a transportation device and a top portion of a recess defining at least one cavity of the transportation device having a first side facing the first direction that is covered by a lens.

22. The energy absorbing system of claim 21, wherein the transportation device is one of:
an unmanned motor vehicle;
an unmanned rail vehicle; and
an unmanned hovercraft or air-cushion vehicle.

* * * * *